(12) United States Patent
Deng et al.

(10) Patent No.: US 12,445,454 B2
(45) Date of Patent: Oct. 14, 2025

(54) NETWORK SECURITY MANAGEMENT METHOD AND COMPUTER DEVICE

(71) Applicant: TENCENT CLOUD COMPUTING (BEIJING) CO., LTD, Beijing (CN)

(72) Inventors: Zhen Deng, Beijing (CN); Zhixin Lin, Beijing (CN); Qi Xiang, Beijing (CN); Quan Zhou, Beijing (CN); Chanjuan Zhang, Beijing (CN)

(73) Assignee: TENCENT CLOUD COMPUTING (BEIJING) CO., LTD, Beijing (CN)

( * ) Notice: Subject to any disclaimer, the term of this patent is extended or adjusted under 35 U.S.C. 154(b) by 211 days.

(21) Appl. No.: 18/123,622

(22) Filed: Mar. 20, 2023

(65) Prior Publication Data
US 2023/0300141 A1     Sep. 21, 2023

Related U.S. Application Data

(63) Continuation of application No. PCT/CN2021/107139, filed on Jul. 19, 2021.

(30) Foreign Application Priority Data

May 20, 2021   (CN) .......................... 202110555000.8

(51) Int. Cl.
*H04L 9/40*      (2022.01)
(52) U.S. Cl.
CPC ............ *H04L 63/105* (2013.01); *H04L 63/20* (2013.01)
(58) Field of Classification Search
CPC ....... H04L 63/105; H04L 63/20; H04L 63/02; H04L 63/10

(Continued)

(56) References Cited

U.S. PATENT DOCUMENTS 10,924,347 B1 *   2/2021   Narsian ................... H04L 47/12
11,316,741 B1 *   4/2022   Bosanac ............. H04L 41/0866
(Continued)

FOREIGN PATENT DOCUMENTS

CN    105871908 A    8/2016
CN    106302371 A    1/2017
(Continued)

OTHER PUBLICATIONS

Office Action in CN202110555000.8, mailed Oct. 17, 2022, 7 pages.

*Primary Examiner* — Aubrey H Wyszynski
(74) *Attorney, Agent, or Firm* — ArentFox Schiff LLP

(57) ABSTRACT

A network security management method is provided. In the method, configuration data that includes at least one access control policy for a network asset of a target cloud tenant is received. The network asset includes a private network, a subnet of the private network, and a cloud instance of the subnet. A network management and control unit and an access control policy set corresponding to the network management and control unit are determined according to the configuration data. The network management and control unit includes one or more of a private network-level management and control unit, a subnet-level management and control unit, and an instance-level management and control unit. The access control policy set of the network management and control unit is transmitted to the cloud instance that is associated with the network management and control unit to manage network traffic of the cloud instance.

19 Claims, 10 Drawing Sheets

(58) Field of Classification Search
USPC .............................................................. 726/1
See application file for complete search history.

(56) References Cited

U.S. PATENT DOCUMENTS

| | | |
|---|---|---|
| 2004/0133876 A1 | 7/2004 | Sproule |
| 2013/0103834 A1* | 4/2013 | Dzerve .................. H04L 67/10 |
| | | 709/225 |
| 2021/0067489 A1* | 3/2021 | Jayawardena ...... H04L 67/1097 |

FOREIGN PATENT DOCUMENTS

| | | |
|---|---|---|
| CN | 109639743 A | 4/2019 |
| CN | 112003750 A | 11/2020 |

* cited by examiner

Client    Server    Instance

Add an inbound rule Shanghai

Access source type  ● IP address  ○ Parameter template
Port protocol type  ● Manual input  ○ Parameter template
Rule priority       ○ First         ● Last

| Execution sequence ⓘ | Access source ⓘ | Access destination ⓘ | Destination port ⓘ | Protocol ⓘ | Policy ⓘ | Description ⓘ |

Access destination type: ○ Cloud server  ○ Cloud database  ○ Elastic network interface card  ○ Load balancer  ● Subnet  ○ Private network  ○ Resource tag  ☐ Automatic bidirectional delivery ⓘ

| 4 | 0.0.0.0/0 | Please select a subnet ▼ | -1/-1 | Please select ▼ | Please select ▼ | Please enter a rule description within 50 characters | Copy Delete |

[ OK ]  [ Cancel ]

Enterprise security group  [Shanghai (3) ▼]     Enterprise security group description

Rule list overview   Quota details   Manage quotas    | Latest operation record ⓘ   View operation logs

| Inbound rule | Outbound rule | Number of security groups |
| 3 | 0 | 4 |
|   |   | Security group quota: 50 |

Latest operation record:
2021-02-07 16:48:13 Caramel cake Edit a rule Rule Details
2021-02-07 16:48:09 Caramel cake Edit a rule Rule Details
2021-02-07 16:48:05 Caramel cake Edit a rule Rule Details
2021-02-07 16:48:01 Caramel cake Edit a rule Rule Details

Inbound rule  Outbound rule

[ Add a rule ]  [ Add a rule ]  [ More operations ▼ ]  [ All statuses ▼ ]

| Execution sequence ⓘ | Access source ⓘ | Access destination ⓘ | Destination port ⓘ | Protocol | Policy ⓘ | Description ⓘ | Status | Operation |
|---|---|---|---|---|---|---|---|---|
| 1 | 0.0.0.0/0 | Ins-hkpl3gal Multiple (2) For dialing test, do not delete | -1/-1 | TCP | Block | rule | ⬤○ | Edit Insert Delete |
| 2 | 0.0.0.0/0 | Ins-hkpl3gal Multiple (2) For dialing test, do not delete | 9158,9159 | TCP | Allow | rule | ⬤○ | Edit Insert Delete |
| 3 | 0.0.0.0/0 | Subnet-hpeiz8er 192.168.1.0/24 LH1 | -1/-1 | ANY | Allow | rule | ○⬤ | Edit Insert Delete |

Total 3 items                                    20 ▼ records/page  |◀ ◀ 1 /1 page ▶ ▶|

FIG. 8

Inbound rule  Outbound rule

| | Source | Protocol port | Policy | Remarks | Modification time | Operation |
|---|---|---|---|---|---|---|
| ☐ | 0.0.0.0/0 | TCP:1-65535 | Allow | rule | 2021-02-07 17:27:44 | Edit  Insert  Delete |
| ☐ | 0.0.0.0/0 | ICMP | Allow | rule | 2021-02-07 17:27:44 | Edit  Insert  Delete |
| ☐ | 0.0.0.0/0 | ICMP | Deny | rule | 2021-02-07 17:27:44 | Edit  Insert  Delete |

Buttons: Add a rule | Import a rule | Sort | Delete | One-tap allow | Settings instructions

FIG. 10

All assets ▼   2021-02-01 00:00:00 to 2021-02-07 23:59:59

Inbound rule  Outbound rule

| Hit time | Access source | Source port | Access destination (my asset) | Destination port | Protocol | Policy |
|---|---|---|---|---|---|---|
| 2021-02-03 20:30:51 | 118.89.53.52 | 46858 | 172.27.0.3 Test blocking of a security group rule | 22 | TCP | • Block |
| 2021-02-03 20:30:51 | 118.89.53.52 | 46858 | 172.27.0.3 Test blocking of a security group rule | 22 | TCP | • Block |
| 2021-02-03 20:29:51 | 118.89.53.52 | 46858 | 172.27.0.3 Test blocking of a security group rule | 22 | TCP | • Block |

FIG. 11

NETWORK SECURITY MANAGEMENT METHOD AND COMPUTER DEVICE

RELATED APPLICATIONS

This application is continuation of International Application No. PCT/CN2021/107139, entitled "NETWORK SECURITY MANAGEMENT METHOD AND COMPUTER DEVICE" and filed on Jul. 19, 2021, which claims priority to Chinese Patent Application No. 202110555000.8, entitled "NETWORK SECURITY MANAGEMENT METHOD AND ELECTRONIC DEVICE" and filed on May 20, 2021. The entire disclosures of the prior applications are hereby incorporated by reference in their entirety.

FIELD OF THE TECHNOLOGY

This disclosure relates to the field of computer technologies, including a network security management method and a computer device.

BACKGROUND OF THE DISCLOSURE

A public cloud is a common deployment type of cloud computing, and may be owned and operated by a cloud computing provider. In the public cloud, resources may be owned and managed by the cloud computing provider, and cloud tenants may share devices such as hardware, storage, and network devices. The cloud tenants may be referred to as tenants for short.

To protect network security of the tenants, the cloud computing provider of the public cloud deploys a firewall in a public cloud environment. In a related method for implementing a firewall for public cloud computing, at a network boundary of the public cloud, network traffic is directed to an independent traffic processing cluster. The traffic processing cluster detects all network traffic and user-preset access control policies in a centralized manner, and reports hit logs for storage.

SUMMARY

Embodiments of this disclosure include a network security management method and a computer device. The network security and management method and computer device may be configured to implement, for example, a distributed firewall configuration, to more effectively resolve management and control problems of intra-cloud attack threats, and protect network security of tenants.

According to an aspect, a network security management method is provided. In the method, configuration data that includes at least one access control policy for a network asset of a target cloud tenant is received. The network asset includes a private network, a subnet of the private network, and a cloud instance of the subnet. A network management and control unit and an access control policy set corresponding to the network management and control unit are determined according to the configuration data. The network management and control unit includes one or more of a private network-level management and control unit, a subnet-level management and control unit, and an instance-level management and control unit. The access control policy set of the network management and control unit is transmitted to the cloud instance that is associated with the network management and control unit to manage network traffic of the cloud instance.

According to another aspect, a network security management method. In the method, a network asset of a cloud tenant is displayed on a network security management interface. The network security management interface includes a configuration area. The network asset includes a private network, a subnet of the private network, and a cloud instance of the subnet. An access control configuration operation is received via the configuration area for the network asset. Configuration data is generated according to the access control configuration operation. The configuration data includes an access control policy for the network asset of the cloud tenant. The configuration data is transmitted to a server. The configuration data indicates a management and control unit and a first access control policy set corresponding to the management and control unit. The management and control unit includes one or more of a private network-level management and control unit, a subnet-level management and control unit, and an instance-level management and control unit.

According to another aspect, an embodiment of this disclosure provides a network security management apparatus. The apparatus includes processing circuitry that is configured to receive configuration data that includes at least one access control policy for a network asset of a target cloud tenant. The network asset includes a private network, a subnet of the private network, and a cloud instance of the subnet. The processing circuitry is configured to determine, according to the configuration data, a network management and control unit and an access control policy set corresponding to the network management and control unit. The network management and control unit includes one or more of a private network-level management and control unit, a subnet-level management and control unit, and an instance-level management and control unit. The processing circuitry is configured to transmit the access control policy set of the network management and control unit to the cloud instance that is associated with the network management and control unit to manage network traffic of the cloud instance.

According to another aspect, an embodiment of this disclosure provides a network security management apparatus. The apparatus includes processing circuitry that is configured to display a network asset of a cloud tenant on a network security management interface. The network security management interface includes a configuration area. The network asset includes a private network, a subnet of the private network, and a cloud instance of the subnet. The processing circuitry is configured to receive an access control configuration operation via the configuration area for the network asset. The processing circuitry is configured to generate configuration data according to the access control configuration operation. The configuration data includes an access control policy for the network asset of the cloud tenant. The processing circuitry is configured to transmit the configuration data to a server. The configuration data indicates a management and control unit and a first access control policy set corresponding to the management and control unit. The management and control unit includes one or more of a private network-level management and control unit, a subnet-level management and control unit, and an instance-level management and control unit.

According to another aspect, an embodiment of this disclosure provides a computer device, including a processor and a computer storage medium, the computer storage medium storing one or more instructions, and the one or more instructions being suitable for being loaded and executed by the processor to perform the network security management method according to any one of the foregoing aspects.

According to another aspect, an embodiment of this disclosure provides another computer device, including a processor and a computer storage medium, the computer storage medium storing one or more instructions, and the one or more instructions being suitable for being loaded and executed by the processor to perform the network security management method according to any one of the foregoing aspects.

According to another aspect, an embodiment of this disclosure provides a non-transitory computer storage medium storing instructions which when executed by a processor cause the processor to perform the network security management method according to any one of the foregoing aspects.

According to another aspect, an embodiment of this disclosure provides a computer program product or a computer program, the computer program product including a computer program, and the computer program being stored in a computer storage medium. A processor of a server reads the computer program from the computer storage medium, and the processor performs the network security management method according to any one of the foregoing aspects.

In some embodiments of this disclosure, one or more management and control units and an access control policy set corresponding to each management and control unit are determined according to acquired configuration data, where the management and control unit includes one or more of a private network-level management and control unit, a sub-net-level management and control unit, and an instance-level management and control unit. Then the access control policy set corresponding to the management and control unit is transmitted to an instance that belongs to the management and control unit. Therefore, network traffic of the instance may be more effectively managed and controlled by using the access control policy set corresponding to each management and control unit, thereby protecting network security of cloud tenants. For different instances, network traffic of the instances is managed and controlled by using access control policy sets corresponding to management and control units to which the instances belong, without directing the network traffic. Based on a basic capability of an instance in a public cloud environment, a distributed firewall configuration is implemented, thereby more effectively adapting to intra-cloud threat management and control scenarios, and protecting network security of cloud tenants.

BRIEF DESCRIPTION OF THE DRAWINGS

FIG. 7 is a schematic diagram of an inbound rule configuration area according to an embodiment of this disclosure.

FIG. 8 is a schematic diagram of an access control management interface according to an embodiment of this disclosure.

FIG. 10 is a schematic diagram of an instance policy viewing area according to an embodiment of this disclosure.

FIG. 11 is a schematic diagram of a log audit interface according to an embodiment of this disclosure.

DESCRIPTION OF EMBODIMENTS

Figure 1:
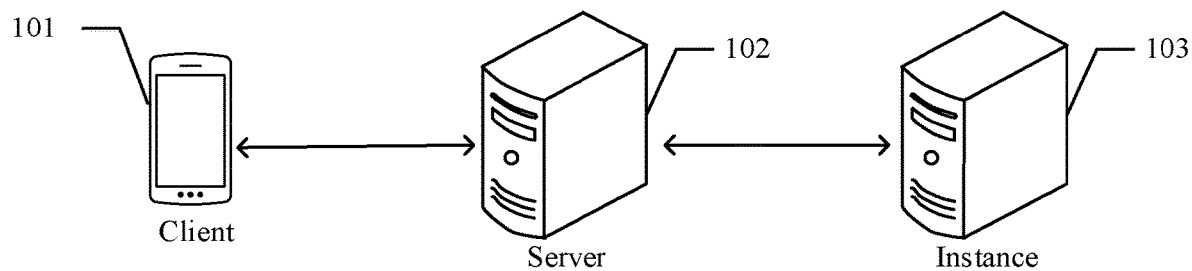
FIG. 1 is a schematic structural diagram of a network security management system according to an embodiment of this disclosure.

Cloud technology includes a hosting technology that integrates a series of resources such as hardware, software, and network resources in a wide area network or a local area network to implement data computing, storage, processing, and sharing.

Cloud technology may be a general term for a network technology, an information technology, an integration technology, a management platform technology, an application technology, and the like that are based on application of a cloud computing business model, and may constitute a resource pool for use on demand and therefore is flexible and convenient. A cloud computing technology is to become an important support. A background service of a technology network system requires a large number of computing and storage resources, such as video websites, picture websites, and more portal websites. With advanced development and application of the Internet industry, in the future, each object may have its own identifier, and needs to be transmitted to a background system for logical processing. Data at different levels is to be processed separately. All types of industry data require a strong system support, which can be implemented only through cloud computing.

Cloud security may be a general term for security software, hardware, users, organizations, and secure cloud platforms that are based on application of a cloud computing business model. The cloud security integrates emerging technologies and concepts such as parallel processing, grid computing, and behavior judgment for unknown viruses. The latest information of Trojan and malicious programs on the Internet is acquired by detecting abnormal software behavior on the network by using a large number of meshed network clients, and the information is transmitted to a server for automatic analysis and processing. Then solutions to viruses and Trojan are distributed to each client.

Exemplary research directions of the cloud security include: 1. cloud computing security, where how to ensure security of a cloud and various applications in the cloud is mainly studied, including security of a cloud computer system, safe storage and isolation of user data, user access authentication, information transmission security, network attack prevention, compliance auditing, and the like; 2. cloudification of security infrastructure, where how to build and integrate security infrastructure resources and optimize a security protection mechanism through cloud computing is mainly studied, including constructing a large-scale security incident and information collection and processing platform by using the cloud computing technology, to collect and analyze correlation of massive information, and improve a network-wide security incident control capability and risk control capability; and 3. cloud security services, where various security services provided for users based on a cloud computing platform are mainly studied, for example, an antivirus service.

Embodiments of this disclosure relate to cloud security and other technologies in the field of cloud technologies. The following exemplary embodiments are used for description.

To implement the foregoing network security management method, an embodiment of this disclosure provides a network security management system. FIG. 1 is a schematic structural diagram of a network security management system according to an embodiment of this disclosure. The network security management system includes but is not limited to one or more clients, one or more servers, and one or more instances. In FIG. 1, one client 101, one server 102, and one instance 103 are used as examples. Wireless links may be established between the client 101, the server 102, and the instance 103 for communication. A quantity and a form of devices shown in FIG. 1 are used as an example and do not constitute a limitation on this embodiment of this disclosure.

The client 101 may be configured to perform a network security management method provided for a client in the embodiments of this disclosure, to configure an access control policy for a network asset of a target tenant, so that the server determines, according to configuration data, one or more management and control units and an access control policy set corresponding to each management and control unit. The server 102 may be configured to perform a network security management method provided for a server in the embodiments of this disclosure, to determine, according to acquired configuration data, one or more management and control units and an access control policy set corresponding to each management and control unit, and then transmit the access control policy set corresponding to each management and control unit to an instance that belongs to each management and control unit. The instance 103 may be configured to receive the access control policy set corresponding to the management and control unit, and manage and control network traffic of the instance by using the access control policy set corresponding to the management and control unit.

The network asset includes a private network, a subnet, and an instance. The management and control unit includes one or more of a private network-level management and control unit, a subnet-level management and control unit, and an instance-level management and control unit. The private network is a cloud network space exclusive to a tenant. Different private networks are completely logically isolated. The subnet is a component of a private network. One private network includes at least one subnet. All cloud instance assets (such as a cloud server and a cloud database) in the private network need to be deployed in the subnet.

In addition, the instance includes one or more of the following: a cloud server, a cloud database, an elastic network interface card, and a load balancer. The cloud server is configured to provide an elastic computing service and expand or reduce computing resources in real time, to reduce hardware and software procurement costs and simplify IT operation and maintenance work, and may be among the most important cloud assets. The cloud database is a database hosting service with high performance, high reliability, and flexible scalability. The elastic network interface card is an elastic network interface bound to a cloud server in a private network, and may be freely migrated between a plurality of cloud servers. The load balancer provides a secure and efficient traffic distribution service. Access traffic can be automatically distributed by the load balancer to a plurality of cloud servers in a cloud, thereby expanding a service capability of a system and eliminating a single point of failure.

In an embodiment, the server 102 and the instance 103 each may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The client 101 may be a smartphone, a tablet computer, a notebook computer, a desktop computer, a smart speaker, a smartwatch, or the like, but is not limited thereto.

In an embodiment, the server 102 and the instance 103 may serve as nodes in a blockchain, and configuration data, a management and control unit, and an access control policy set corresponding to each management and control unit may be stored in the blockchain.

Figure 2:
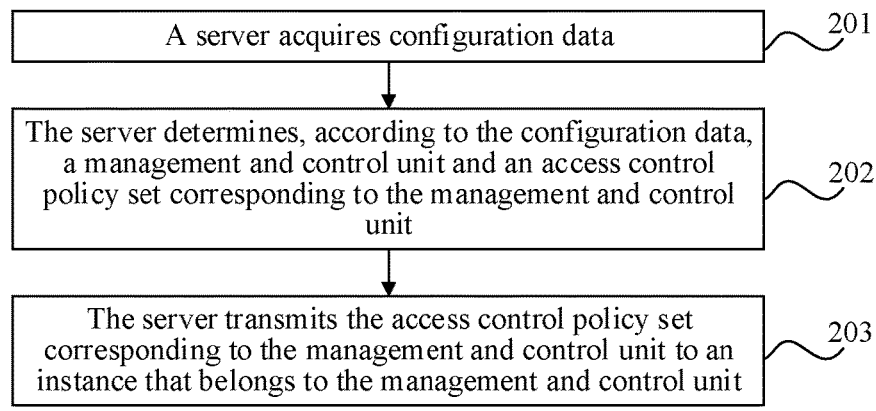
FIG. 2 is a schematic flowchart of a network security management method according to an embodiment of this disclosure.

Based on the foregoing network security management system, an embodiment of this disclosure provides a network security management method. FIG. 2 is a schematic flowchart of a network security management method according to an embodiment of this disclosure. The network security management method may be applied to the network security management system shown in FIG. 1, and is performed by a server, and specifically, may be performed by a processor of the server. The network security management method may include the following steps:

In step S201, the server acquires configuration data.

In an embodiment, the configuration data includes at least one access control policy for a network asset of a target tenant. The network asset includes a private network, a subnet, and an instance. The instance includes one or more of the following: a cloud server, a cloud database, an elastic network interface card, a load balancer, and the like. In an example, the server receives configuration data transmitted by a client. The access control policy is a management and control policy for resource access, and prevents unauthorized access to any resource, so that a network asset is accessed within an authorized range.

Figure 3:
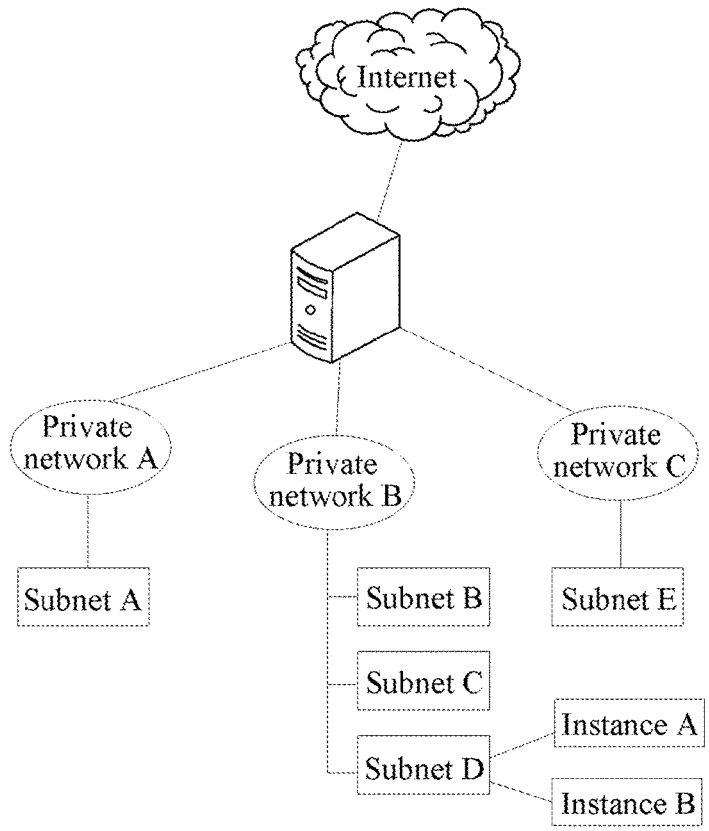
FIG. 3 is a topology of a network asset of a user according to an embodiment of this disclosure.

In an embodiment, the private network includes at least one subnet, and the subnet includes at least one instance. FIG. 3 is a topology of a network asset of a user according to an embodiment of this disclosure. The configuration data acquired by the server includes three private networks (a private network A, a private network B, and a private network C), five subnets (a subnet A, a subnet B, a subnet C, a subnet D, and a subnet E), and two instances (an instance A and an instance B) of the target tenant. The private network A includes a subnet A. The private network B includes three subnets: a subnet B, a subnet C, and a subnet D. The private network C includes a subnet E. The subnet D includes two instances: an instance A and an instance B.

In an embodiment, the server may invoke a cloud network asset information acquisition interface, to acquire network asset information of the target tenant, and transmit the network asset information to a client corresponding to the target tenant. In this manner, the client may subsequently configure an access control policy for the network asset of the target tenant. The target tenant may be a tenant or a user of a public cloud. In the public cloud, the target tenant is represented in a form of a company name, a user name, an account, or the like.

In step S202, the server determines, according to the configuration data, a management and control unit and an access control policy set corresponding to the management and control unit.

The management and control unit includes one or more of a private network-level management and control unit, a subnet-level management and control unit, and an instance-level management and control unit.

Exemplary ranges of instances managed by the management and control unit are as follows in descending order: a private network-level management and control unit>a subnet-level management and control unit>an instance-level management and control unit. One management and control unit has the same access control policy.

One cloud instance asset (namely, an instance) belongs only to one management and control unit. In this manner, the server can maintain as few access control policies as possible, thereby reducing system consumption.

When one management and control unit has a plurality of access control policies, the plurality of access control policies may also be referred to as an access control policy set. To simplify description, in this embodiment, the "access control policy" represents one or more access control policies.

In step S203, the server transmits an access control policy corresponding to the management and control unit to an instance that belongs to the management and control unit.

An access control policy corresponding to each management and control unit is used for managing and controlling network traffic of an instance of each management and control unit.

An access control policy in an access control policy set of each management and control unit may include one or more levels of access control policies. For example, an access control policy set of an instance-level management and control unit includes a policy a, a policy b, a policy c, a policy d, and a policy e. The policy a and the policy b correspond to access control policies of one instance. The policy c and the policy d correspond to access control policies of one subnet. The policy e corresponds to an access control policy of a private network. In this manner, a final node on which an access control policy set corresponding to each management and control unit takes effect is placed in each instance, and each instance may execute access control policies included in an access control policy set corresponding to a management and control unit to which the instance belongs. In this way, a distributed firewall configuration is implemented, thereby more effectively adapting to intra-cloud management and control scenarios, and protecting network security of cloud tenants.

In an embodiment, the server receives an access control hit information transmitted by each instance, and stores the access control hit information. In this manner, an access control policy hit status, such as attack logs, of each instance can be stored for subsequent viewing by a user. The access control hit information is information generated when an access control policy is hit by traffic of an instance.

To sum up, in this embodiment of this disclosure, configuration data is acquired, where the configuration data includes an access control policy for a network asset of a target tenant, and the network asset includes a private network, a subnet, and an instance; a management and control unit and an access control policy set corresponding to the management and control unit are determined according to the configuration data, where the management and control unit includes one or more of a private network-level management and control unit, a subnet-level management and control unit, and an instance-level management and control unit; and the access control policy set corresponding to the management and control unit is transmitted to an instance that belongs to the management and control unit, where the access control policy set is used for managing and controlling network traffic of the instance.

It is to be understood that access control policies for the network asset of the target tenant are distributed to management and control units, and for different instances, network traffic of the instances is managed and controlled by using access control policy sets corresponding to management and control units to which the instances belong, without directing the network traffic. This is based on a basic capability of an instance in a public cloud environment, and implementation is simple. In addition, this can effectively adapt to intra-cloud threat management and control scenarios, and protect network security of cloud tenants.

Figure 4:
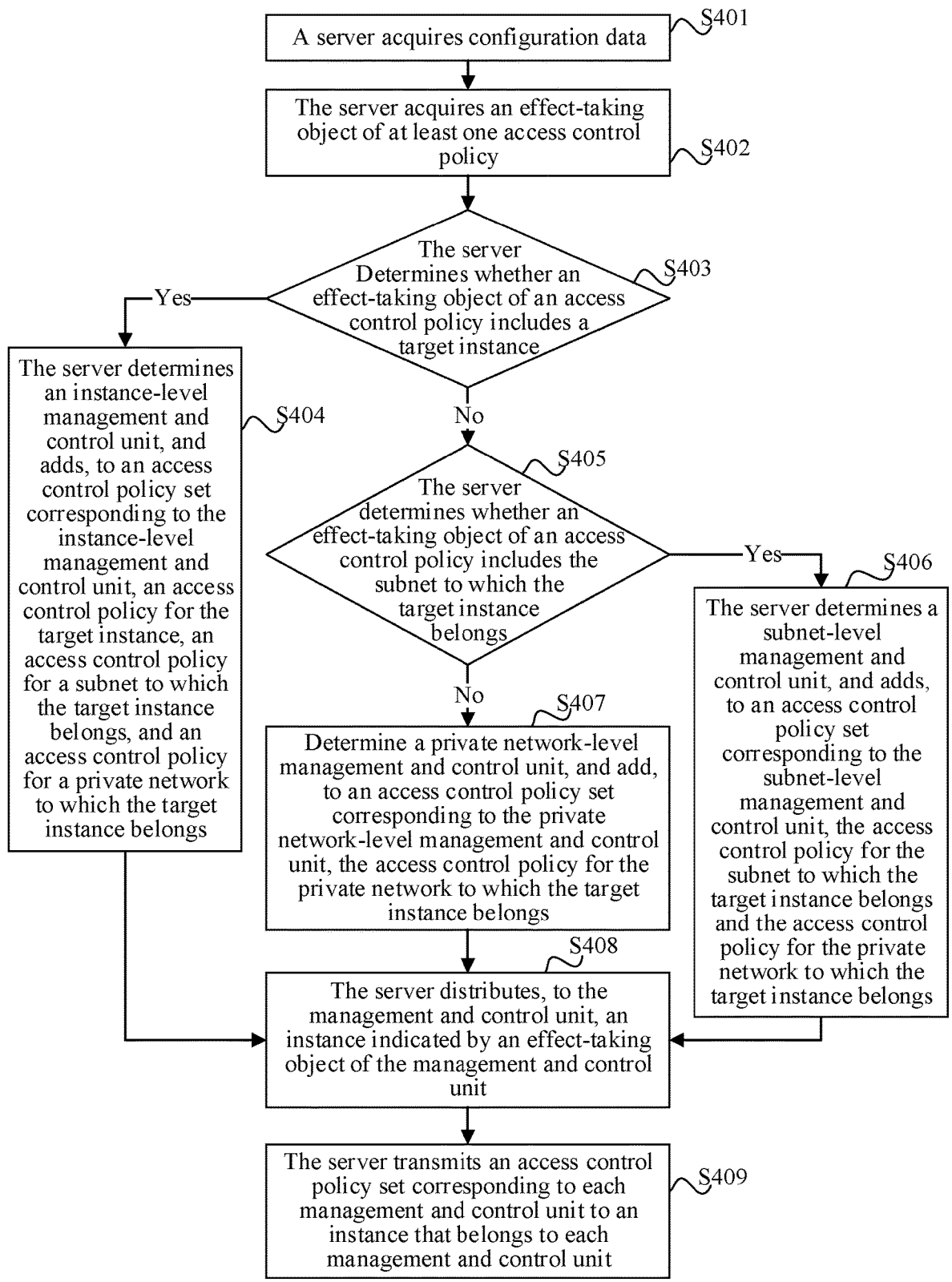
FIG. 4 is a schematic flowchart of a network security management method according to an embodiment of this disclosure.

FIG. 4 is a schematic flowchart of a network security management method according to an embodiment of this disclosure. The network security management method may be applied to the network security management system shown in FIG. 1, and is performed by a server, and specifically, may be performed by a processor of the server. The network security management method may include the following steps:

In step S401, the server acquires configuration data.

A specific implementation of S401 may be the same as that of step S201, and details are not described herein again.

In step S402, the server acquires an effect-taking object of the at least one access control policy.

In an embodiment, the effect-taking object is any network asset of the target tenant. In this manner, the server traverses an effect-taking object of each access control policy to determine one or more management and control units and an access control policy set corresponding to each management and control unit.

For example, the effect-taking object may be any one of a private network, a subnet, and an instance.

In step S403, the server determines whether an effect-taking object of an access control policy includes a target instance. If an effect-taking object of an access control policy includes the target instance, step S404 is performed. If no effect-taking object of an access control policy includes the target instance, step S405 is performed.

In step S404, the server determines an instance-level management and control unit, and adds, to an access control policy set corresponding to the instance-level management and control unit, an access control policy for the target instance, an access control policy for a subnet to which the target instance belongs, and an access control policy for a private network to which the target instance belongs.

In an embodiment, the target instance is any instance of the target tenant. Different target instances correspond to different instance-level management and control units.

For example, the target instance is a cloud database, an access control policy for the cloud database is a policy A, an access control policy for a subnet to which the cloud database belongs is a policy B, and an access control policy for a private network to which the cloud database belongs is a policy C. The server determines that the cloud database has an access control policy, and therefore determines an instance-level management and control unit, and adds the policy A, the policy B, and the policy C to an access control policy set corresponding to the instance-level management and control unit.

In step S405, the server determines whether an effect-taking object of an access control policy includes the subnet to which the target instance belongs. If an effect-taking object of an access control policy includes the subnet to which the target instance belongs, step S406 is performed. If no effect-taking object of an access control policy includes the subnet to which the target instance belongs, step S407 is performed.

In an embodiment, the server determines that no effect-taking object of an access control policy includes the target instance, and therefore further determines whether an effect-taking object of an access control policy includes the subnet to which the target instance belongs.

In step S406, the server determines a subnet-level management and control unit, and adds, to an access control policy set corresponding to the subnet-level management and control unit, the access control policy for the subnet to which the target instance belongs and the access control policy for the private network to which the target instance belongs.

For example, the target instance is a cloud database, the cloud database does not have an access control policy, an access control policy for a subnet to which the cloud database belongs is a policy B, and an access control policy for a private network to which the cloud database belongs is a policy C. The server determines that the subnet to which the cloud database belongs has an access control policy, and therefore determines a subnet-level management and control unit, and adds the policy B and the policy C to an access control policy set corresponding to the subnet-level management and control unit.

In step S407, if an effect-taking object of an access control policy includes the access control policy for the private network to which the target instance belongs, determine a private network-level management and control unit, and add, to an access control policy set corresponding to the private network-level management and control unit, the access control policy for the private network to which the target instance belongs.

In an embodiment, the server determines that no effect-taking object of an access control policy includes the target instance or the subnet to which the target instance belongs, and an effect-taking object of an access control policy includes the private network to which the target instance belongs, and therefore determines a private network-level management and control unit, and determines an access control policy set corresponding to the private network-level management and control unit.

For example, the target instance is a cloud database, neither the cloud database nor a subnet to which the cloud database belongs has an access control policy, and an access control policy for a private network to which the cloud database belongs is a policy C. The server determines that the private network to which the cloud database belongs has an access control policy, and therefore determines a private network-level management and control unit, and adds the policy C to an access control policy set corresponding to the private network-level management and control unit.

In an embodiment, after the server determines, according to the configuration data, one or more management and control units and an access control policy set corresponding to each management and control unit, the server needs to detect whether an access control policy for a network asset of the target tenant changes, and if the access control policy changes, updates the access control policy set corresponding to the management and control unit.

Steps S402 to S407 are an exemplary implementation of step S202.

In step S408, for a first management and control unit of the one or more management and control units, if the first management and control unit is an instance-level management and control unit, the server distributes, to the first management and control unit, an instance indicated by an effect-taking object of the instance-level management and control unit.

In an embodiment, the first management and control unit is any one of the one or more management and control units. One cloud instance asset belongs only to one management and control unit. Management and control units to which instances belong conform to a principle of a minimum management and control range, and management and control ranges are as follows in descending order: a private network-level management and control unit>a subnet-level management and control unit>an instance-level control unit.

For example, it is assumed that the first management and control unit is an instance-level management and control unit A, and the instance indicated by the effect-taking object of the instance-level management and control unit is a cloud database. In this case, the cloud database is distributed to the instance-level management and control unit A.

In an embodiment, if the first management and control unit is a subnet-level management and control unit, the server distributes, to the first management and control unit, an instance included in a subnet indicated by an effect-taking object of the subnet-level management and control unit.

For example, it is assumed that the first management and control unit is a subnet-level management and control unit A, and the subnet indicated by the effect-taking object of the subnet-level management and control unit is a subnet A, where the subnet A includes an instance A and an instance B. Therefore, both the instance A and the instance B are distributed to the subnet-level management and control unit A.

In an embodiment, if the first management and control unit is a private network-level management and control unit, the server distributes, to the first management and control unit, an instance included in a private network indicated by an effect-taking object of the private network-level management and control unit.

For example, it is assumed that the first management and control unit is a private network-level management and control unit A, and the private network indicated by the effect-taking object of the private network-level management and control unit is a private network A, where private network A includes a subnet A and a subnet B, the subnet A includes an instance A and an instance B, and the subnet B includes an instance C. Therefore, the instance A, the instance B, and the instance C are all distributed to the private network-level management and control unit A.

In step S409, the server transmits an access control policy set corresponding to each management and control unit to an instance that belongs to each management and control unit.

For example, an instance Q belongs to an instance-level management and control unit 1, and an access control policy set corresponding to the instance-level management and control unit 1 includes a policy A, a policy B, and a policy C. Therefore, the server transmits the policy A, the policy B, and the policy C to the instance Q, and the instance Q manages and controls inbound and outbound network traffic according to the policy A, the policy B, and the policy C.

An exemplary implementation of step S409 is the same as that of step S203, and details are not described herein again.

To sum up, in this embodiment of this disclosure, configuration data is acquired, where the configuration data includes an access control policy for a network asset of a target tenant, and the network asset includes a private network, a subnet, and an instance; one or more management and control units and an access control policy set corresponding to each management and control unit are determined according to the configuration data, where the management and control unit includes one or more of a private network-level management and control unit, a subnet-level management and control unit, and an instance-level management and control unit; and the access control policy set corresponding to each management and control unit is transmitted to an instance that belongs to each management and control unit, where the access control policy set is used for managing and controlling network traffic of the instance. It is to be understood that access control policies for the network asset of the target tenant are distributed to management and control units, and for different instances, network traffic of the instances is managed and controlled by using access control policy sets corresponding to management and control units to which the instances belong, without directing the network traffic. This is based on a basic capability of an instance in a public cloud environment, and implementation is simple. In addition, this can effectively adapt to intra-cloud threat management and control scenarios, and protect network security of cloud tenants.

Figure 5:
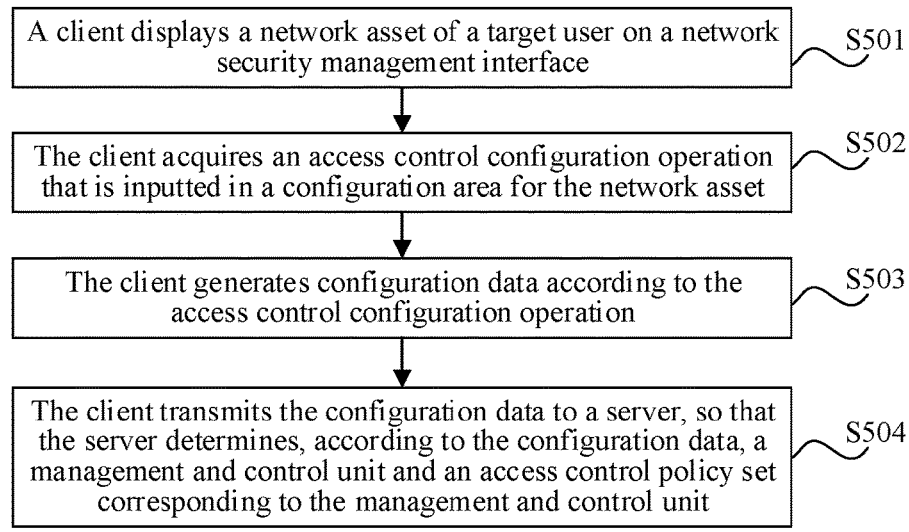
FIG. 5 is a schematic flowchart of a network security management method according to an embodiment of this disclosure.

FIG. 5 is a schematic flowchart of a network security management method according to an embodiment of this disclosure. The network security management method may be applied to the network security management system shown in FIG. 1, and is performed by a client, and specifically, may be performed by a processor of the client. The network security management method may include the following steps:

In step S501, the client displays a network asset of a target tenant on a network security management interface.

Figure 6:
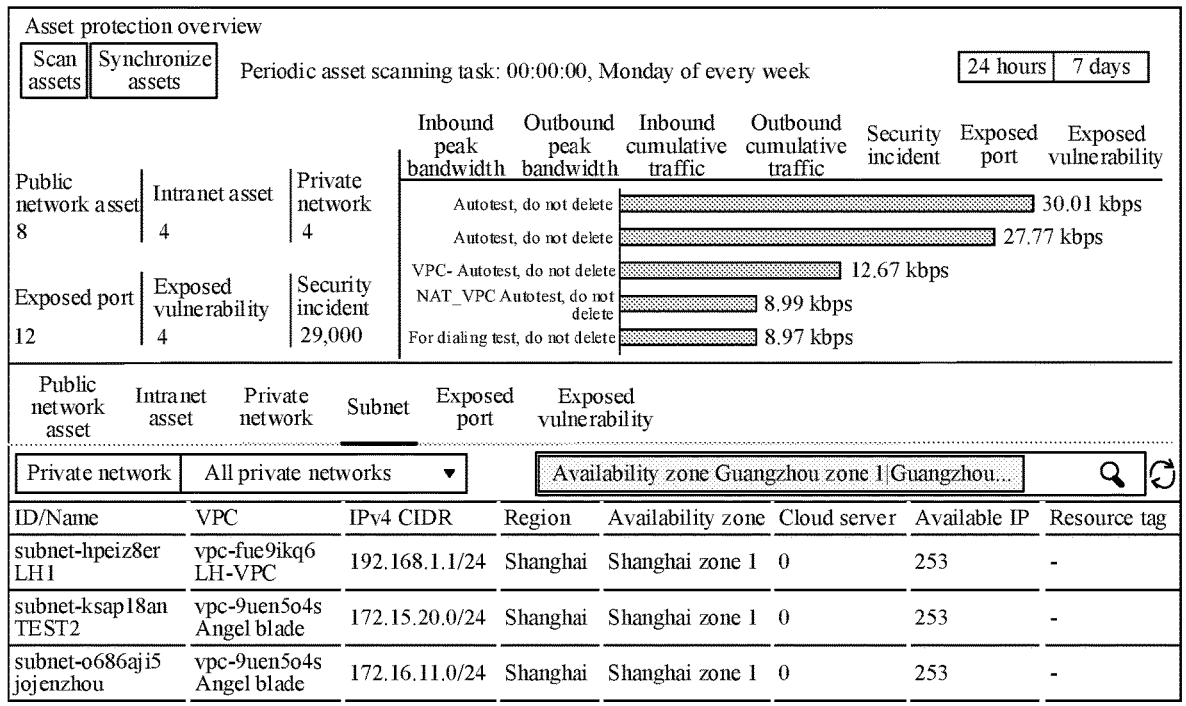
FIG. 6 is a schematic diagram of a network security management interface according to an embodiment of this disclosure.

In an embodiment, the network asset includes a private network, a subnet, and an instance. FIG. 6 is a schematic diagram of a network security management interface according to an embodiment of this disclosure. A user may acquire all network assets of the user by using an asset scanning option or an asset synchronization option on the interface. The user may further set an asset scanning period (for example, a period of 7 days or a period of 24 hours), to scan all the network assets of the user at a fixed period.

In addition, the network security management interface further includes the number of public network assets, the number of intranet assets, the number of private networks, the number of exposed ports, the number of exposed vulnerabilities, and the number of security incidents, and further includes bar charts for inbound peak bandwidth, outbound peak bandwidth, inbound cumulative traffic, outbound cumulative traffic, security incidents, exposed ports, and exposed vulnerabilities. The network security management interface further provides six network asset options: a public network asset option, an intranet asset option, a private network asset option, a subnet option, an exposed port option, and an exposed vulnerability option. When the client detects a tap operation performed by the user on the six network asset options, a network asset corresponding to a network asset option selected by the tap operation is visually displayed, including a name or an identity document (ID) of the network asset, a virtual private cloud (VPC) to which the network asset belongs, Internet Protocol version 4 classless inter-domain routing (IPv4 CIDR), a region, an availability zone, a cloud server, available Internet Protocol (IP), and a resource tag. The user may further quickly query for a network asset in a query area.

In an embodiment, the network security management interface further includes a configuration area, so that the user can configure an access control policy for the network asset in the configuration area. FIG. 7 is a schematic diagram of an inbound rule configuration area according to an embodiment of this disclosure. The configuration area includes an access source type option, a port protocol type option, and a rule priority option. The access source type option includes an IP address and a parameter template. The port protocol type option includes manual input and a parameter template. The rule priority option includes first and last. The parameter template represents a set of IP addresses. All configurations are performed based on the parameter template, thereby reducing workload of the user in policy configuration.

In addition, the access control policies configured by the user needs to include an access destination type, an execution sequence, an access source, an access destination, a destination port, a protocol, a policy, and a description. The access destination type includes a cloud server, a cloud database, an elastic network interface card, a load balancer, a subnet, a private network, and a resource tag. The policy includes a rule for blocking or allowing various layer 3 network protocols. The layer 3 network protocols include Transmission Control Protocol (TCP), User Datagram Protocol (UDP), Internet Control Message Protocol, ICMP), and the like. The user may synchronize inbound and outbound rules by using an automatic bidirectional delivery option, thereby reducing workload of the user in policy configuration.

For example, the access control policy configured on the client may be as follows: An execution sequence is 4, an access source is 0.0.0.0/0, an access destination is Ins-hkp13 gal, a destination port is −1/−1, a protocol is the TCP protocol, a policy is blocking, a description is a rule, and an access destination type is a subnet.

In step S502, the client acquires an access control configuration operation that is inputted in the configuration area for the network asset.

In an embodiment, the client configures access control policies for different network assets in the configuration area, and acquires access control configuration operations that are inputted for the network assets, so that the client can subsequently generate configuration data for the access control configuration operations.

In step S503, the client generates configuration data according to the access control configuration operation.

In an embodiment, the configuration data includes an access control policy for the network asset of the target tenant. The client displays the access control policy for the network asset of the target tenant on an access control management interface. FIG. 8 is a schematic diagram of an access control management interface according to an embodiment of this disclosure. An enterprise security group is Shanghai, and includes a total of three rules. The access control management interface includes the number of inbound rules, the number of outbound rules, the number of security groups, and a security group quota. Details about the security group quota may be viewed, and the quota may also be managed. The access control management interface further includes operation logs, and the user may view the latest operation record.

In addition, access control policies, displayed on the access control management interface, for all network assets of the target tenant include an execution sequence, an access source, an access destination, a destination port, a protocol, a policy, a description, a status, and an operation. The operation includes editing, inserting, and deleting options. The user may further add a new access control policy by using a rule adding option on the access control management interface. The user may further quickly query for an access control policy in a query area.

In step S504, the client transmits the configuration data to a server, so that the server determines, according to the configuration data, a management and control unit and an access control policy set corresponding to the management and control unit.

In an embodiment, the management and control unit includes one or more of a private network-level management and control unit, a subnet-level management and control unit, and an instance-level management and control unit. The client transmits the configuration data to the server, so that the server can determine, according to the configuration data, one or more management and control units and an access control policy set corresponding to each management and control unit.

To sum up, in this embodiment of this disclosure, the network asset of the target tenant is displayed on the network security management interface, the access control configuration operation that is inputted in the configuration area for the network asset is acquired, and then the configuration data is generated according to the access control configuration operation, and the configuration data is transmitted to the server. It is to be understood that the access control policy for the network asset of the target tenant is configured in the configuration area, and the configuration data is transmitted to the server, so that the server determines, according to the configuration data, one or more management and control units and an access control policy set corresponding to each management unit. The user may flexibly configure an access control policy for each network asset as needed.

Figure 9:
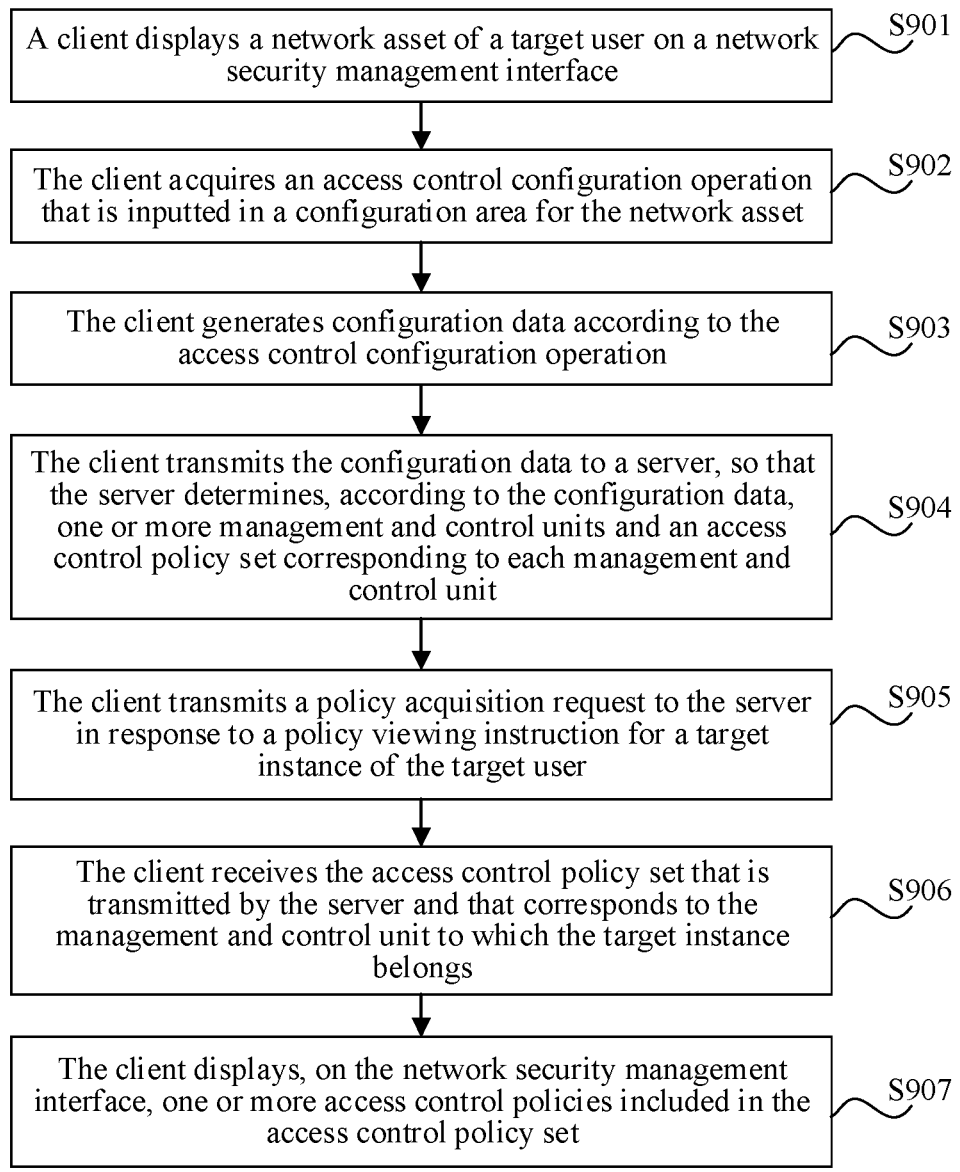
FIG. 9 is a schematic flowchart of a network security management method according to an embodiment of this disclosure.

FIG. 9 is a schematic flowchart of a network security management method according to an embodiment of this disclosure. The network security management method may be applied to the network security management system shown in FIG. 1, and is performed by a client, and specifically, may be performed by a processor of the client. The network security management method may include the following steps:

In step S901, the client displays a network asset of a target tenant on a network security management interface.

In step S902, the client acquires an access control configuration operation that is inputted in a configuration area for the network asset.

In step S903, the client generates configuration data according to the access control configuration operation.

In step S904, the client transmits the configuration data to a server, so that the server determines, according to the configuration data, a management and control unit and an access control policy set corresponding to the management and control unit.

An exemplary implementation of steps S901 to S904 is the same as that of steps S501 to S504, and details are not described herein again.

In step S905, the client transmits a policy acquisition request to the server in response to a policy viewing instruction for a target instance of the target tenant.

In an embodiment, the policy acquisition request includes an instance identifier of the target instance. The client determines the instance identifier of the target instance according to the policy viewing instruction for the target instance of the target tenant, and transmits the policy acquisition request to the server, so that the server determines an access control policy set corresponding to a management and control unit to which the target instance belongs.

In step S906, the client receives the access control policy set that is transmitted by the server and that corresponds to the management and control unit to which the target instance belongs.

In an embodiment, the client determines an effective access control policy of the target instance by using the acquired access control policy set corresponding to the management and control unit to which the target instance belongs.

In step S907, the client displays, on the network security management interface, one or more access control policies included in the access control policy set.

In an embodiment, in an instance policy viewing area on the network security management interface, according to tap operations performed by the user on different instance options, access control policy sets for instances corresponding to instance options that correspond to the tap operations may be displayed on the network security management interface. FIG. 10 is a schematic diagram of an instance policy viewing area according to an embodiment of this disclosure. The instance policy viewing area includes an inbound rule option and an outbound rule option. The inbound rule represents a rule about another server or device accessing the target tenant. The outbound rule represents a rule about the target tenant accessing another server or device. The instance policy viewing area further includes a rule adding option, a rule import option, a sorting option, a deleting option, and a one-tap allow option. The rule adding option is used for adding a new access control policy. The one-tap allow option is used for setting all access control policies to allow. In addition, the displayed access control policy includes a source, a protocol port, a policy, remarks, a modification time, and an operation. The operation includes editing, inserting, and deleting options.

In an embodiment, the client displays access control hit information of each instance on a log audit interface. In this manner, reliability of network security management can be improved. FIG. 11 is a schematic diagram of a log audit interface according to an embodiment of this disclosure. The log audit interface includes an inbound rule and an outbound rule. The access control hit information includes a hit time, an access source, a source port, an access destination (my asset), a destination port, a protocol, and a policy.

To sum up, in this embodiment of this disclosure, the network asset of the target tenant is displayed on the network security management interface, the access control configuration operation that is inputted in the configuration area for the network asset is acquired, and then the configuration data is generated according to the access control configuration operation, and the configuration data is transmitted to the server. It is to be understood that the access control policy for the network asset of the target tenant is configured in the configuration area, and the configuration data is transmitted to the server, so that the server determines, according to the configuration data, one or more management and control units and an access control policy set corresponding to each management unit.

Figure 12:
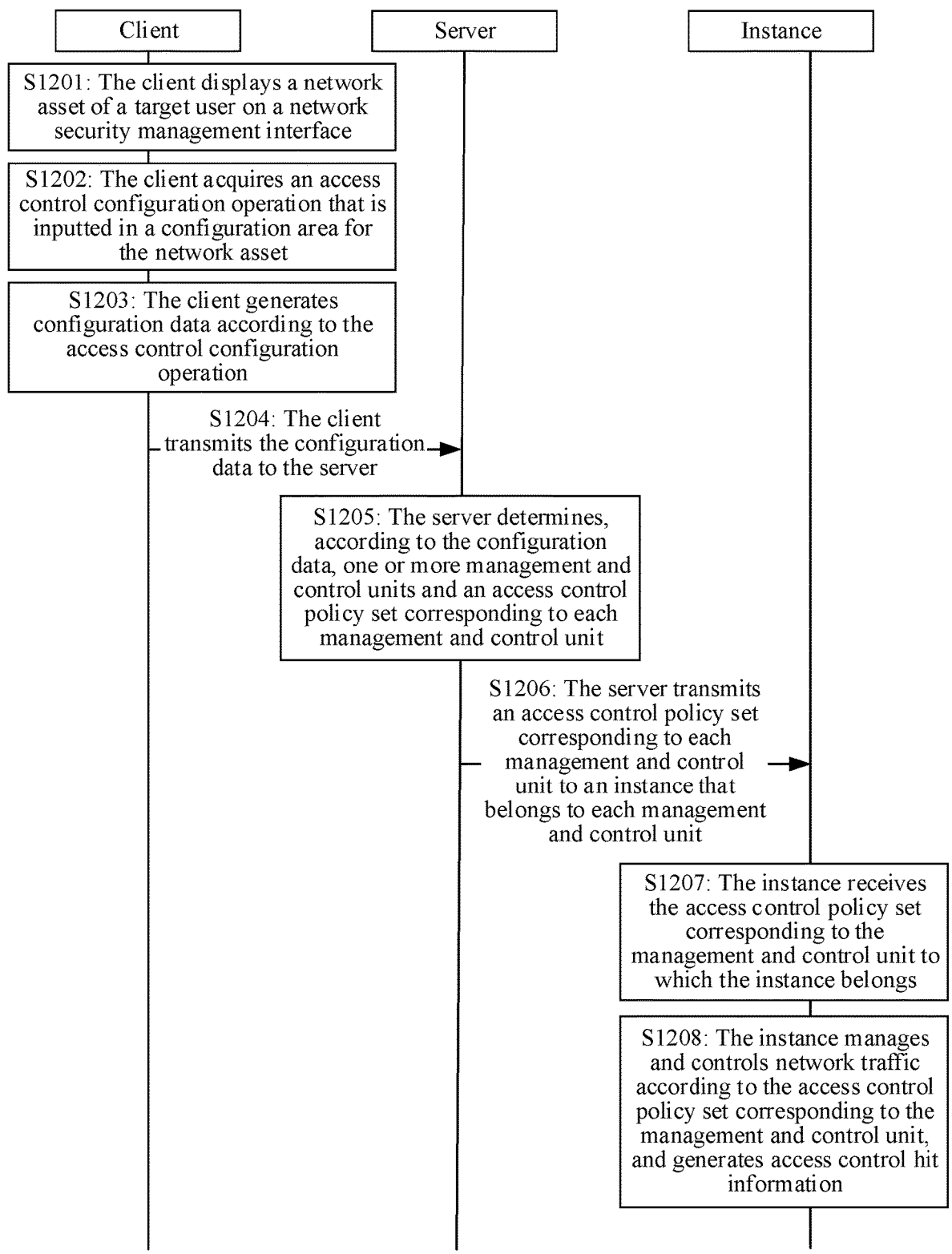
FIG. 12 is a schematic flowchart of a network security management method according to an embodiment of this disclosure.

FIG. 12 is a schematic flowchart of a network security management method according to an embodiment of this disclosure. The network security management method may be applied to the network security management system shown in FIG. 1, and is implemented through interaction between a server, a client, and an instance, and specifically, may be performed by a processor of the server, a processor of the client, and a processor of the instance. The network security management method may include the following steps:

In step S1201, the client displays a network asset of a target tenant (or user) on a network security management interface.

In step S1202, the client acquires an access control configuration operation that is inputted in a configuration area for the network asset.

In step S1203, the client generates configuration data according to the access control configuration operation.

In step S1204, the client transmits the configuration data to the server.

In step S1205, the server determines, according to the configuration data, a management and control unit and an access control policy set corresponding to the management and control unit.

In step S1206, the server transmits the access control policy set corresponding to the management and control unit to an instance that belongs to the management and control unit.

In step S1207, the instance receives the access control policy set corresponding to the management and control unit to which the instance belongs.

In step S1208, the instance manages and controls network traffic according to the access control policy set corresponding to the management and control unit, and generates access control hit information.

A exemplary implementation of steps S1201 to S1208 is the same as that described in the foregoing embodiments, and details are not described herein again.

To sum up, in this embodiment of this disclosure, the client configures an access control policy for the network asset of the target tenant, so that the server determines, according to the configuration data, one or more management and control units and an access control policy set corresponding to each management and control unit. The server determines, according to the acquired configuration data, one or more management and control units and an access control policy set corresponding to each management and control unit, and then transmits the access control policy set corresponding to each management and control unit to an instance that belongs to each management and control unit. The instance receives the access control policy set corresponding to the management and control unit, and manages and controls network traffic of the instance by using the access control policy set corresponding to the management and control unit. Based on the method described in FIG. 12, a distributed firewall configuration can be implemented, thereby more effectively resolving intra-cloud attack and threat management and control problems, and protecting network security of cloud tenants.

Figure 13:
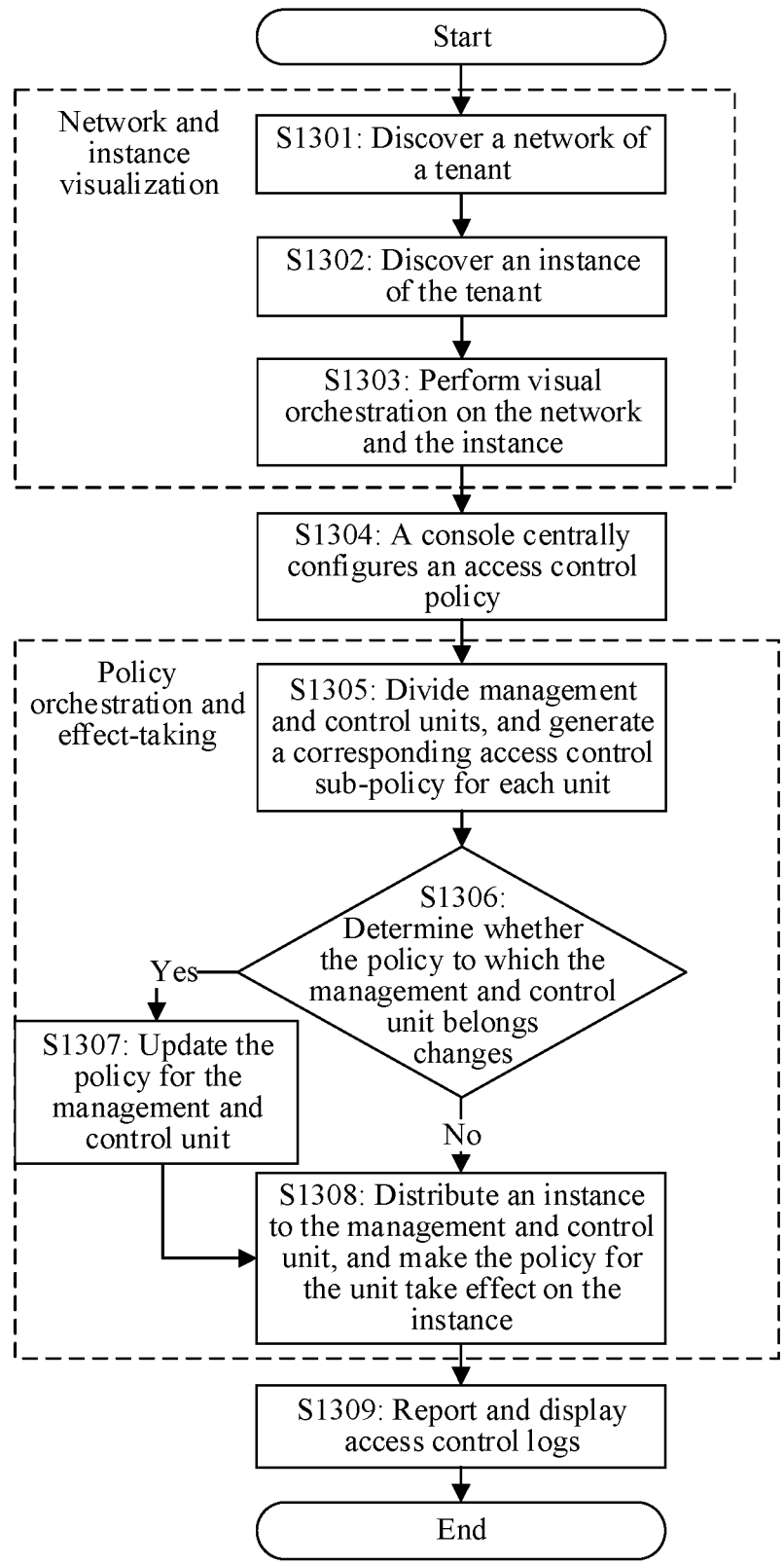
FIG. 13 is a schematic flowchart of a network security management method according to an embodiment of this disclosure.

FIG. 13 is a schematic flowchart of a network security management method according to an embodiment of this disclosure. The network security management method may be applied to the network security management system shown in FIG. 1, and is implemented through interaction between a server, a client, and an instance, and specifically, may be performed by a processor of the server, a processor of the client, and a processor of the instance. The network security management method may include the following steps:

In step S1301, a network of a tenant is discovered, where the tenant corresponds to the target tenant in the foregoing embodiments.

In step S1302, an instance of the tenant is discovered.

In step S1303, visual orchestration on the network and the instance is performed.

In step S1304, a console centrally configures an access control policy.

In an embodiment, the console acquires related instance data and network data at specific intervals, compares the data with existing data, and synchronously updates a network and an instance with changes in a timely manner to ensure real-time performance of data.

In step S1305, management and control units are divided, and a corresponding access control policy for each management and control unit is generated.

In step S1306, a determination is made as to whether the policy to which the management and control unit belongs changes. If the policy to which the management and control unit belongs changes, step S1307 is performed. If the policy to which the management and control unit belongs does not change, step S1308 is performed.

In step S1307, the policy for the management and control unit is updated.

In step S1308, an instance is distributed to the management and control unit, and the access control policy for the management and control unit is made to take effect on the instance.

An exemplary manner in which the access control policy for the management and control unit takes effect on the instance is as follows: The access control policy set corresponding to each management and control unit is transmitted to an instance that belongs to each management and control unit, and the instance manages and controls network traffic by using the access control policy set.

In step S1309, access control logs are reported and displayed.

In an embodiment, each instance transmits a log message through a message queue service according to traffic and a policy hit status of the instance, and the log message is processed by a log service and then stored and displayed in a unified manner.

An exemplary implementation of steps S1301 to S1309 is the same as that described in the foregoing embodiments, and details are not described herein again. Steps S1301 to S1303 are used for network and instance visualization, and Steps S1305 to S1308 are used for policy orchestration and effect-taking.

To sum up, in this embodiment of this disclosure, the client configures an access control policy for the network asset of the target tenant, so that the server determines, according to the configuration data, one or more management and control units and an access control policy set corresponding to each management and control unit. The server determines, according to the acquired configuration data, one or more management and control units and an access control policy set corresponding to each management and control unit, and then transmits the access control policy set corresponding to each management and control unit to an instance that belongs to each management and control unit. The instance receives the access control policy set corresponding to the management and control unit, and manages and controls network traffic of the instance by using the access control policy set corresponding to the management and control unit. Based on the method described in FIG. 13, a distributed firewall configuration can be implemented, thereby more effectively resolving intra-cloud attack and threat management and control problems, and protecting network security of cloud tenants.

Figure 14:
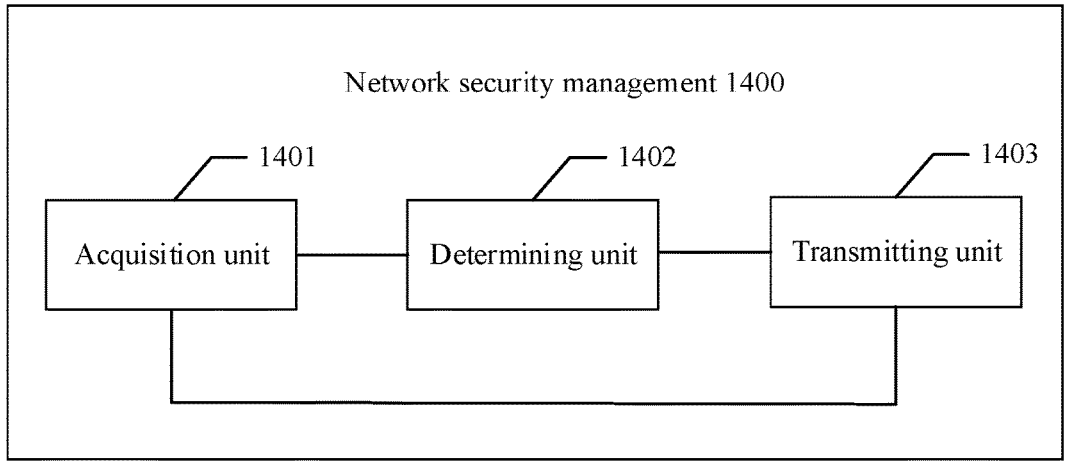
FIG. 14 is a schematic structural diagram of a network security management apparatus according to an embodiment of this disclosure.

Based on the foregoing network security management method, an embodiment of this disclosure provides a network security management apparatus. FIG. 14 is a schematic structural diagram of a network security management apparatus 1400 according to an embodiment of this disclosure. The network security management apparatus 1400 may run the following units: an acquisition unit 1401, a determining unit 1402, and a transmitting unit 1403. One or more modules, submodules, and/or units of the apparatus can be implemented by processing circuitry, software, or a combination thereof, for example.

The acquisition unit 1401 is configured to acquire configuration data, where the configuration data includes an access control policy for a network asset of a target tenant, the network asset includes a private network, a subnet, and an instance, the private network includes at least one subnet, and the subnet includes at least one instance.

The determining unit 1402 is configured to determine, according to the configuration data, a management and control unit and an access control policy set corresponding to the management and control unit, where the management and control unit includes one or more of a private network-level management and control unit, a subnet-level management and control unit, and an instance-level management and control unit.

The transmitting unit 1403 is configured to transmit the access control policy set corresponding to the management and control unit to an instance that belongs to the management and control unit, where the access control policy set is used for managing and controlling network traffic of the instance.

In an embodiment, when determining, according to the configuration data, one or more management and control units and an access control policy set corresponding to each management and control unit, the determining unit 1402 is configured to: acquire an effect-taking object of the at least one access control policy; determine an instance-level management and control unit in a case that an effect-taking object of an access control policy includes a target instance, where the target instance is any instance of the target tenant; and add, to an access control policy set corresponding to the instance-level management and control unit, an access control policy for the target instance, an access control policy for a subnet to which the target instance belongs, and an access control policy for a private network to which the target instance belongs.

In an embodiment, the determining unit 1402 is further configured to: determine a subnet-level management and control unit in a case that no effect-taking object of an access control policy includes the target instance, but an effect-taking object of an access control policy includes the subnet to which transmit the target instance belongs; and add, to an access control policy set corresponding to the subnet-level management and control unit, the access control policy for the subnet to which the target instance belongs and the access control policy for the private network to which the target instance belongs.

In an embodiment, the determining unit 1402 is further configured to: determine a private network-level management and control unit in a case that no effect-taking object of an access control policy includes the target instance or the subnet to which the target instance belongs, but an effect-taking object of an access control policy includes the private network to which the target instance belongs; and add, to an access control policy set corresponding to the private network-level management and control unit, the access control policy for the private network to which the target instance belongs.

In an embodiment, the apparatus further includes a division unit, and the division unit is configured to: for the instance-level management and control unit, distribute, to the instance-level management and control unit, an instance indicated by an effect-taking object of the instance-level management and control unit; for the subnet-level management and control unit, distribute, to the subnet-level management and control unit, an instance included in a subnet indicated by an effect-taking object of the subnet-level management and control unit; and for the private network-level management and control unit, distribute, to the private network-level management and control unit, an instance in a private network indicated by an effect-taking object of the private network-level management and control unit.

According to an embodiment of this disclosure, the steps included in the network security management method shown in FIG. 2 may be performed by the units of the network security management apparatus shown in FIG. 14. For example, step S201 shown in FIG. 2 may be performed by the acquisition unit 1401 of the network security management apparatus 1400 shown in FIG. 14, step S202 may be performed by the determining unit 1402 of the network security management apparatus 1400 shown in FIG. 14, and step S203 may be performed by the transmitting unit 1403 of the network security management apparatus 1400 shown in FIG. 14.

According to another embodiment of this disclosure, the units of the network security management apparatus shown in FIG. 14 may be separately or wholly combined into one or several other units, or one (or more) of the units herein may be further divided into a plurality of units of smaller functions. In this way, the same operations can be implemented without affecting implementation of the technical effects of the embodiments of this disclosure. The foregoing units are divided based on logical functions. During practical application, a function of one unit may alternatively be implemented by a plurality of units, or functions of a plurality of units are implemented by one unit. In another embodiment of this disclosure, the network security management apparatus may alternatively include another unit. During practical application, these functions may alternatively be cooperatively implemented by another unit and may be cooperatively implemented by a plurality of units.

According to another embodiment of this disclosure, a computer program (including program code) capable of performing the steps included in the corresponding method shown in FIG. 2 may be run on a general-purpose computing device, for example, a computer, that includes a processing element and a storage element such as a central processing unit (CPU), a random access memory (RAM), and a read-only memory (ROM), to construct the network security management apparatus shown in FIG. 14, and implement the network security management method in the embodiments of this disclosure. The computer program may be recorded in, for example, a computer storage medium, and may be loaded to the foregoing computing device by using the computer storage medium, and run on the computing device.

In this embodiment of this disclosure, one or more management and control units and an access control policy set corresponding to each management and control unit are determined according to acquired configuration data, where the management and control unit includes one or more of a private network-level management and control unit, a subnet-level management and control unit, and an instance-level management and control unit. Then the access control policy set corresponding to each management and control unit is transmitted to an instance that belongs to each management and control unit. Therefore, network traffic of the instance may be more effectively managed and controlled by using the access control policy set corresponding to each management and control unit, thereby protecting network security of cloud tenants. In this way, for different instances, network traffic of the instances is managed and controlled by using access control policy sets corresponding to management and control units to which the instances belong, without directing the network traffic. This is based on a basic capability of an instance in a public cloud environment, and implementation is simple. In addition, this can more effectively adapt to intra-cloud threat management and control scenarios, and protect network security of cloud tenants.

Figure 15:
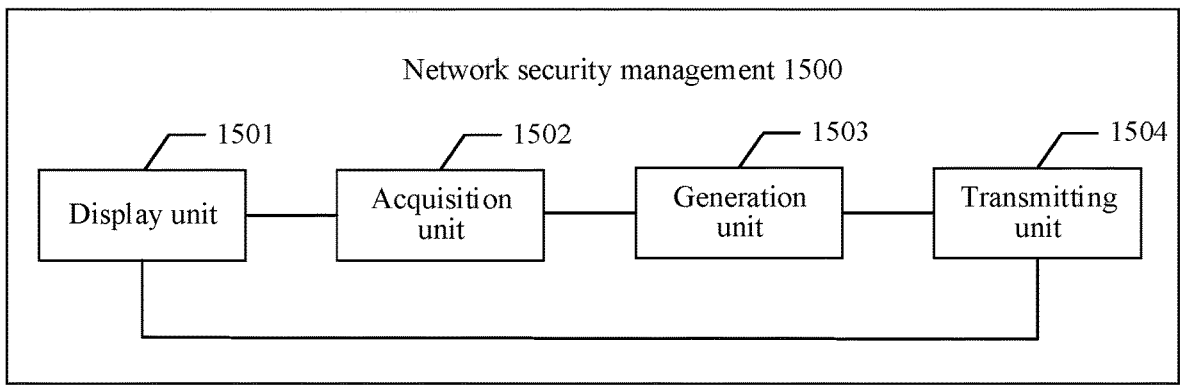
FIG. 15 is a schematic structural diagram of another network security management apparatus according to an embodiment of this disclosure.

Based on the foregoing network security management method, an embodiment of this disclosure provides another network security management apparatus. FIG. 15 is a schematic structural diagram of a network security management apparatus according to an embodiment of this disclosure. The network security management apparatus 1500 may run the following units: a display unit 1501, an acquisition unit 1502, a generation unit 1503, and a transmitting unit 1504. One or more modules, submodules, and/or units of the apparatus can be implemented by processing circuitry, software, or a combination thereof, for example.

The display unit 1501 is configured to display a network asset of a target tenant on a network security management interface, where the network security management interface includes a configuration area, and the network asset includes a private network, a subnet, and an instance.

The acquisition unit 1502 is configured to acquire an access control configuration operation that is inputted in the configuration area for the network asset.

The generation unit 1503 is configured to generate configuration data according to the access control configuration operation, where the configuration data includes an access control policy for the network asset of the target tenant.

The transmitting unit 1504 is configured to transmit the configuration data to a server, so that the server determines, according to the configuration data, a management and control unit and an access control policy set corresponding to the management and control unit, where the management and control unit includes one or more of a private network-level management and control unit, a subnet-level management and control unit, and an instance-level management and control unit.

In an embodiment, the apparatus further includes a response unit and a receiving unit. The response unit is configured to transmit a policy acquisition request to the server in response to a policy viewing instruction for a target instance of the target tenant, where the policy acquisition request includes an instance identifier of the target instance. The receiving unit is configured to receive an access control policy set that is transmitted by the server and that corresponds to a management and control unit to which the target instance belongs. The display unit is further configured to display, on the network security management interface, one or more access control policies included in the access control policy set.

According to an embodiment of this disclosure, the steps included in the network security management method shown in FIG. 5 may be performed by the units of the network security management apparatus shown in FIG. 15. For example, step S501 shown in FIG. 5 may be performed by the display unit 1501 of the network security management apparatus 1500 shown in FIG. 15, step S502 may be performed by the acquisition unit 1502 of the network security management apparatus 1500 shown in FIG. 15, step S503 may be performed by the generation unit 1503 of the network security management apparatus 1500 shown in FIG. 15, and step S504 may be performed by the transmitting unit 1504 of the network security management apparatus 1500 shown in FIG. 15.

According to another embodiment of this disclosure, the units of the network security management apparatus shown in FIG. 15 may be separately or wholly combined into one or several other units, or one (or more) of the units herein may be further divided into a plurality of units of smaller functions. In this way, the same operations can be implemented without affecting implementation of the technical effects of the embodiments of this disclosure. The foregoing units are divided based on logical functions. During practical application, a function of one unit may alternatively be implemented by a plurality of units, or functions of a plurality of units are implemented by one unit. In another embodiment of this disclosure, the network security management apparatus may alternatively include another unit. During practical application, these functions may alternatively be cooperatively implemented by another unit and may be cooperatively implemented by a plurality of units.

According to another embodiment of this disclosure, a computer program (including program code) capable of performing the steps included in the corresponding method shown in FIG. 2 may be run on a general-purpose computing device, for example, a computer, that includes a processing element and a storage element such as a central processing unit (CPU), a random access memory (RAM), and a read-only memory (ROM), to construct the network security management apparatus shown in FIG. 9, and implement the network security management method in the embodiments of this disclosure. The computer program may be recorded in, for example, a computer storage medium, and may be loaded to the foregoing computing device by using the computer storage medium, and run on the computing device.

In this embodiment of this disclosure, the network asset of the target tenant is displayed on the network security management interface, the access control policy for the network asset of the target tenant may be configured in the configuration area, and the configuration data is transmitted to the server, so that the server determines, according to the configuration data, one or more management and control units and an access control policy set corresponding to each management unit. In this way, the access control policy for the network asset of the target tenant is configured in the configuration area, and the configuration data is transmitted to the server, so that the server determines, according to the configuration data, one or more management and control units and an access control policy set corresponding to each management unit.

Figure 16:
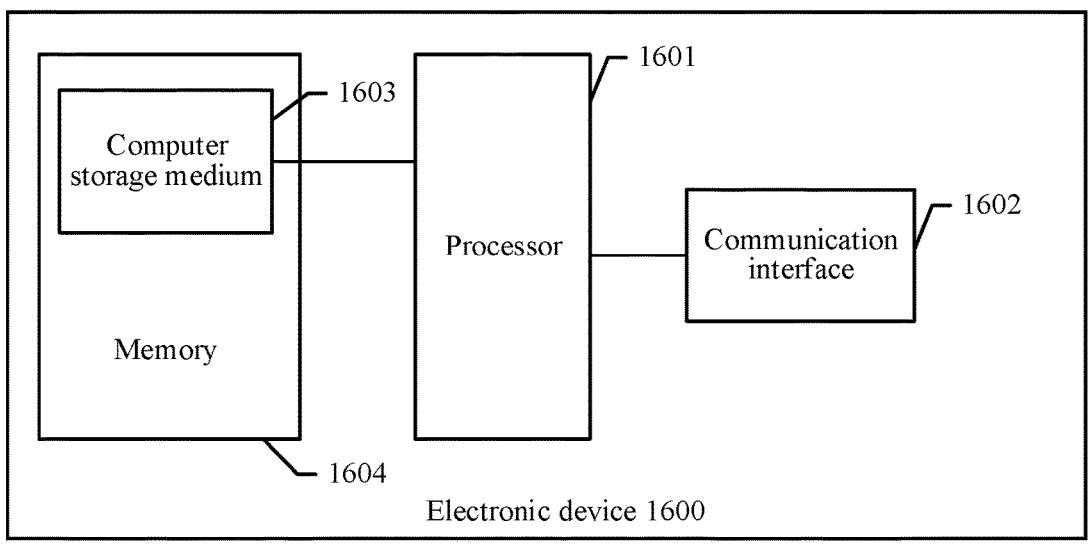
FIG. 16 is a schematic structural diagram of a computer device according to an embodiment of this disclosure.

Based on the foregoing embodiments of the network security management method and the network security management apparatus, an embodiment of this disclosure provides a computer device. The computer device herein corresponds to the foregoing server. FIG. 16 is a schematic structural diagram of a server according to an embodiment of this disclosure. The computer device 1600 may include processing circuitry such as at least a processor 1601, a communication interface 1602, and a computer storage medium 1603. The processor 1601, the communication interface 1602, and the computer storage medium 1603 may be connected through a bus or in another manner.

The computer storage medium 1603 may be stored in a memory 1604 of the computer device 1600. The computer storage medium 1603 is configured to store a computer program. The computer program includes program instructions. The processor 1601 is configured to execute the program instructions stored in the computer storage medium 1603. The processor 1601 (or referred to as a central processing unit (CPU)) is a computing core and a control core of the computer device 1600, and is suitable for implementing one or more instructions, and specifically, is suitable for loading and performing the following operations: acquiring configuration data, where the configuration data includes an access control policy for a network asset of a target tenant, and the network asset includes a private network, a subnet, and an instance; determining, according to the configuration data, one or more management and control units and an access control policy set corresponding to each management and control unit, where the management and control unit includes one or more of a private network-level management and control unit, a subnet-level management and control unit, and an instance-level management and control unit; and transmitting the access control policy set corresponding to each management and control unit to an instance that belongs to each management and control unit, where the access control policy set is used for managing and controlling network traffic of the instance.

In this embodiment of this disclosure, one or more management and control units and an access control policy set corresponding to each management and control unit are determined according to acquired configuration data, where the management and control unit includes one or more of a private network-level management and control unit, a subnet-level management and control unit, and an instance-level management and control unit. Then the access control policy set corresponding to each management and control unit is transmitted to an instance that belongs to each management and control unit. Therefore, network traffic of the instance may be more effectively managed and controlled by using the access control policy set corresponding to each management and control unit, thereby protecting network security of cloud tenants. In this way, for different instances, network traffic of the instances is managed and controlled by using access control policy sets corresponding to management and control units to which the instances belong, without directing the network traffic. This is based on a basic capability of an instance in a public cloud environment, and implementation is simple. In addition, this can more effectively adapt to intra-cloud threat management and control scenarios, and protect network security of cloud tenants.

Figure 17:
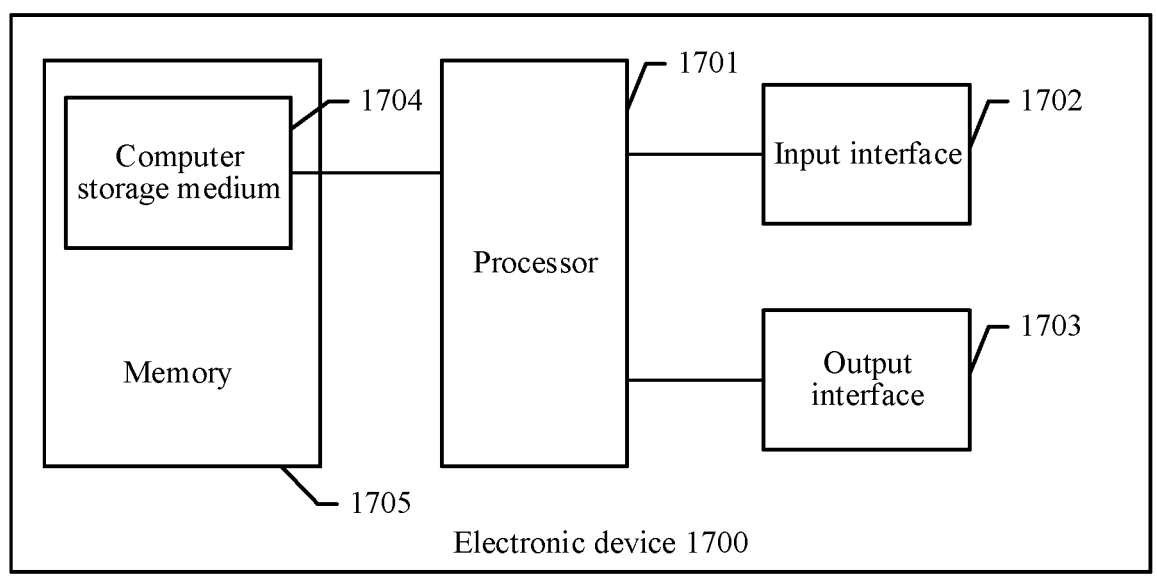
FIG. 17 is a schematic structural diagram of another computer device according to an embodiment of this disclosure.

Based on the foregoing embodiments of the network security management method and the network security management apparatus, an embodiment of this disclosure further provides another computer device. The computer device herein corresponds to the foregoing client. FIG. 17 is a schematic structural diagram of a computer device according to an embodiment of this disclosure. The computer device 1700 may include processing circuitry such as at least a processor 1701, an input interface 1702, an output interface 1703, and a computer storage medium 1704 that may be connected through a bus or in another manner.

The computer storage medium 1704 may be stored in a memory 1705 of the computer device 1700. The computer storage medium 1704 is configured to store a computer program. The computer program includes program instructions. The processor 1701 is configured to execute the program instructions stored in the computer storage medium 1704. The processor 1701 (or referred to as a central processing unit (CPU)) is a computing core and a control core of the computer device, and is suitable for implementing one or more instructions, and specifically, is suitable for loading and performing the following operations: displaying a network asset of a target tenant on a network security management interface, where the network security management interface includes a configuration area, and the network asset includes a private network, a subnet, and an instance; acquiring an access control configuration operation that is inputted in the configuration area for the network asset; generating configuration data according to the access control configuration operation, where the configuration data includes an access control policy for the network asset of the target tenant; and transmitting the configuration data to a server, so that the server determines, according to the configuration data, one or more management and control units and an access control policy set corresponding to each management and control unit, where the management and control unit includes one or more of a private network-level management and control unit, a subnet-level management and control unit, and an instance-level management and control unit.

In this embodiment of this disclosure, the network asset of the target tenant is displayed on the network security management interface, the access control policy for the network asset of the target tenant may be configured in the configuration area, and the configuration data is transmitted to the server, so that the server determines, according to the configuration data, one or more management and control units and an access control policy set corresponding to each management unit. In this way, the access control policy for the network asset of the target tenant is configured in the configuration area, and the configuration data is transmitted to the server, so that the server determines, according to the configuration data, one or more management and control units and an access control policy set corresponding to each management unit.

An embodiment of this disclosure further provides a computer storage medium (memory). The computer storage medium is a memory device in a computer device, and is configured to store a program and data. It may be understood that the computer storage medium herein may include a built-in storage medium in the computer device, or may include an extended storage medium supported by the computer device. The computer storage medium provides a storage space, and the storage space stores an operating system of the computer device. In addition, the storage space further stores one or more instructions suitable for being loaded and executed by the processor 1601 or 1701. These instructions may be one or more computer programs (including program code). The computer storage medium herein may be a high-speed RAM memory, or may be a non-volatile memory, for example, at least one magnetic disk memory. In an example, the computer storage medium may alternatively be at least one computer storage medium that is located away from the foregoing processor.

In an embodiment, in the computer storage medium, the processor 1601 may load and execute one or more instructions stored in the computer storage medium, to implement corresponding steps of the related network security management method shown in FIG. 2.

In another embodiment, in the computer storage medium, the processor 1701 may load and execute one or more instructions stored in the computer storage medium, to implement corresponding steps of the related network security management method shown in FIG. 5.

According to an aspect of this disclosure, an embodiment of this disclosure further provides a computer product or a computer program. The computer product or the computer program includes computer instructions, and the computer instructions are stored in a computer storage medium.

In an example, the processor 1601 reads the computer instructions from the computer storage medium, and the processor 1601 executes the computer instructions, so that the computer device performs the network security management method shown in FIG. 2.

In an example, the processor 1701 reads the computer instructions from the computer storage medium, and the processor 1701 executes the computer instructions, so that the computer device performs the network security management method shown in FIG. 5.

A person of ordinary skill in the art may notice that the exemplary units and steps described with reference to the embodiments disclosed in this disclosure can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it shall not be considered that the implementation goes beyond the scope of this disclosure.

All or some of the foregoing embodiments may be implemented by using software, hardware, firmware, or any combination thereof. When software is used for implementation, implementation may be entirely or partially performed in the form of a computer program product. The computer program product includes one or more computer instructions. When the computer program instructions are loaded and executed on a computer, all or some of the processes or functions according to the embodiments of this disclosure are produced. The computer may be a general-purpose computer, a dedicated computer, a computer network, or another programmable device. The computer instructions may be stored in a computer storage medium, or transmitted through the computer storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium capable of being accessed by a computer or include one or more data storage devices integrated by an available medium, such as a server and a data center. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely exemplary implementations of this disclosure, and are not intended to limit the scope of this disclosure. Other embodiments are within the scope of this disclosure.

What is claimed is:

1. A network security management method, comprising:
receiving configuration data that includes at least one access control policy for a network asset of a target cloud tenant, the network asset including a private network, a subnet of the private network, and a cloud instance of the subnet;
displaying a network security management interface, the network security management interface including a configuration area based on the configuration data;
determining, by processing circuitry and according to the configuration data, a network management and control unit and a first access control policy set corresponding to the network management and control unit, the network management and control unit including one or more of a private network-level management and control unit, a subnet-level management and control unit, and an instance-level management and control unit;
transmitting a policy acquisition request to a server in response to a policy viewing instruction received via the configuration area of the network security management interface, the policy acquisition request including an instance identifier of the cloud instance;
receiving a second access control policy set corresponding to the network management and control unit associated with the cloud instance; and
displaying, on the network security management interface, one or more access control policies included in the second access control policy set.

2. The method according to claim 1, wherein the at least one access control policy includes a management and control policy for resource access.

3. The method according to claim 1, wherein the first access control policy set is transmitted to the cloud instance and includes an access and control policy for at least one of the private network or the subnet.

4. The method according to claim 1, wherein the determining comprises:
acquiring an effect-taking object of the at least one access control policy;
determining the network management and control unit includes the instance-level management and control unit based on the effect-taking object being the cloud instance; and
adding, to an access control policy set of the instance-level management and control unit, an access control policy for the cloud instance, an access control policy for the subnet that includes the cloud instance, and an access control policy for the private network.

5. The method according to claim 4, further comprising:
determining the network management and control unit includes the subnet-level management and control unit based on the effect-taking object being the subnet; and
adding, to an access control policy set of the subnet-level management and control unit, the access control policy for the subnet and the access control policy for the private network.

6. The method according to claim 5, further comprising:
  determining the network management and control unit includes the private network-level management and control unit based on the effect-taking object being the private network; and
  adding, to an access control policy set of the private network-level management and control unit, the access control policy for the private network.

7. The method according to claim 1, wherein before the transmitting, the method further comprises:
  based on the network management and control unit including the instance-level management and control unit, distributing the cloud instance indicated by an effect-taking object of the instance-level management and control unit to the instance-level management and control unit;
  based on the network management and control unit including the subnet-level management and control unit, distributing the cloud instance included in the subnet indicated by an effect-taking object of the subnet-level management and control unit to the subnet-level management and control unit; and
  based on the network management and control unit including the private network-level management and control unit, distributing the cloud instance in the private network indicated by an effect-taking object of the private network-level management and control unit to the private network-level management and control unit.

8. A network security management method, comprising:
  displaying a network asset of a cloud tenant on a network security management interface, the network security management interface including a configuration area, the network asset including a private network, a subnet of the private network, and a cloud instance of the subnet;
  receiving an access control configuration operation via the configuration area for the network asset;
  generating configuration data according to the access control configuration operation, the configuration data including an access control policy for the network asset of the cloud tenant, the configuration area being displayed based on the configuration data;
  transmitting the configuration data to a server, the configuration data indicating a management and control unit and a first access control policy set corresponding to the management and control unit, the management and control unit including one or more of a private network-level management and control unit, a subnet-level management and control unit, and an instance-level management and control unit;
  transmitting a policy acquisition request to the server in response to a policy viewing instruction received via the configuration area of the of the network security management interface, the policy acquisition request including an instance identifier of the cloud instance;
  receiving a second access control policy set from the server, the received second access control policy set corresponding to the management and control unit associated with the cloud instance; and
  displaying, on the network security management interface, one or more access control policies included in the second access control policy set.

9. The method according to claim 8, wherein the access control policy includes a management and control policy for resource access.

10. The method according to claim 8, wherein the access control policy for at least one of the private network or the subnet.

11. A network security management apparatus, comprising:
  processing circuitry configured to:
    receive configuration data that includes at least one access control policy for a network asset of a target cloud tenant, the network asset including a private network, a subnet of the private network, and a cloud instance of the subnet;
    display a network security management interface, the network security management interface including a configuration area based on the configuration data;
    determine, according to the configuration data, a network management and control unit and a first access control policy set corresponding to the network management and control unit, the network management and control unit including one or more of a private network-level management and control unit, a subnet-level management and control unit, and an instance-level management and control unit;
    transmit a policy acquisition request to a server in response to a policy viewing instruction received via the configuration area of the network security management interface, the policy acquisition request including an instance identifier of the cloud instance;
    receive a second access control policy set corresponding to the network management and control unit associated with the cloud instance; and
    display, on the network security management interface, one or more access control policies included in the second access control policy set.

12. The network security management apparatus according to claim 11,
  wherein the at least one access control policy includes a management and control policy for resource access.

13. The network security management apparatus according to claim 11, wherein the access control policy set is transmitted to the cloud instance and includes an access and control policy for at least one of the private network or the subnet.

14. The network security management apparatus according to claim 11, wherein the processing circuitry is configured to:
  acquire an effect-taking object of the at least one access control policy;
  determine the network management and control unit includes the instance-level management and control unit based on the effect-taking object being the cloud instance; and
  add, to an access control policy set of the instance-level management and control unit, an access control policy for the cloud instance, an access control policy for the subnet that includes the cloud instance, and an access control policy for the private network.

15. The network security management apparatus according to claim 14, wherein the processing circuitry is configured to:
  determine the network management and control unit includes the subnet-level management and control unit based on the effect-taking object being the subnet; and
  add, to an access control policy set of the subnet-level management and control unit, the access control policy for the subnet and the access control policy for the private network.

16. The network security management apparatus according to claim 15, wherein the processing circuitry is configured to:
- determine the network management and control unit includes the private network-level management and control unit based on the effect-taking object being the private network; and
- add, to an access control policy set of the private network-level management and control unit, the access control policy for the private network.

17. The network security management apparatus according to claim 11, wherein before the access control policy set is transmitted, the processing circuitry is configured to:
- based on the network management and control unit including the instance-level management and control unit, distribute the cloud instance indicated by an effect-taking object of the instance-level management and control unit to the instance-level management and control unit;
- based on the network management and control unit including the subnet-level management and control unit, distribute the cloud instance included in the subnet indicated by an effect-taking object of the subnet-level management and control unit to the subnet-level management and control unit; and
- based on the network management and control unit including the private network-level management and control unit, distribute the cloud instance in the private network indicated by an effect-taking object of the private network-level management and control unit to the private network-level management and control unit.

18. A non-transitory computer-readable storage medium storing instructions which when executed by a processor cause the processor to perform:
- receiving configuration data that includes at least one access control policy for a network asset of a target cloud tenant, the network asset including a private network, a subnet of the private network, and a cloud instance of the subnet;
- displaying a network security management interface, the network security management interface including a configuration area based on the configuration data;
- determining, according to the configuration data, a network management and control unit and a first access control policy set corresponding to the network management and control unit, the network management and control unit including one or more of a private network-level management and control unit, a subnet-level management and control unit, and an instance-level management and control unit;
- transmitting a policy acquisition request to a server in response to a policy viewing instruction received via the configuration area of the network security management interface, the policy acquisition request including an instance identifier of the cloud instance;
- receiving a second access control policy set corresponding to the network management and control unit associated with the cloud instance; and
- displaying, on the network security management interface, one or more access control policies included in the second access control policy set.

19. A non-transitory computer-readable storage medium storing instructions which when executed by a processor cause the processor to perform:
- displaying a network asset of a cloud tenant on a network security management interface, the network security management interface including a configuration area, the network asset including a private network, a subnet of the private network, and a cloud instance of the subnet;
- receiving an access control configuration operation via the configuration area for the network asset;
- generating configuration data according to the access control configuration operation, the configuration data including an access control policy for the network asset of the cloud tenant, the configuration area being displayed based on the configuration data;
- transmitting the configuration data to a server, the configuration data indicating a management and control unit and a first access control policy set corresponding to the management and control unit, the management and control unit including one or more of a private network-level management and control unit, a subnet-level management and control unit, and an instance-level management and control unit;
- transmitting a policy acquisition request to the server in response to a policy viewing instruction received from the configuration area, the policy acquisition request including an instance identifier of the cloud instance;
- receiving a second access control policy set from the server, the received second access control policy set corresponding to the management and control unit associated with the cloud instance; and
- displaying, on the network security management interface, one or more access control policies included in the second access control policy set.

* * * * *